United States Patent
Wolf et al.

(10) Patent No.: US 6,278,694 B1
(45) Date of Patent: Aug. 21, 2001

(54) COLLECTING AND REPORTING MONITORING DATA FROM REMOTE NETWORK PROBES

(75) Inventors: Jay B. Wolf, Framingham; Will C. Lauer, Marlborough; Bradley S. Carey, E. Walpole; Lawrence A. Stabile, Cochituate, all of MA (US)

(73) Assignee: Concord Communications Inc., Marlboro, MA (US)

( * ) Notice: Subject to any disclaimer, the term of this patent is extended or adjusted under 35 U.S.C. 154(b) by 0 days.

(21) Appl. No.: 09/293,021

(22) Filed: Apr. 16, 1999

(51) Int. Cl.[7] ............................................ H04J 1/16
(52) U.S. Cl. ................................. 370/253; 709/224
(58) Field of Search ............................ 370/253, 252, 370/232, 449; 709/224; 710/46, 220; 340/825.08, 825.15; 707/10; 706/50; 714/39, 43

(56) References Cited

U.S. PATENT DOCUMENTS 5,615,359 * 3/1997 Yung ..................................... 707/10
5,781,703 * 7/1998 Desai ..................................... 706/50
5,886,643 3/1999 Diebboll et al. ................. 340/825.08

OTHER PUBLICATIONS

Remote Network Monitoring Management Information Base Version 2, Waldbusser, pp 1, 79, 86–87, Jan. 1997.*

* cited by examiner

Primary Examiner—Edwin C. Holloway, III
(74) Attorney, Agent, or Firm—Fish & Richardson P.C.

(57) ABSTRACT

A method for collecting and reporting monitored data for network traffic, which has been accumulated by a plurality of remote probes. The method includes making a series of polling requests for lists of monitoring data to each probe and receiving the requested lists. Each list has traffic count values that are identified by at least a sampling time, a source address, a destination address and a probe identifier. The method also includes calculating the traffic observed by each probe between successive sampling times and apportioning the calculated traffic data among a single set of consecutive temporal intervals and selecting best counts to avoid overcounting.

32 Claims, 7 Drawing Sheets

80 — BLOCK FOR TEMPORAL INTERVAL 1223

| ADDRESS PAIR | PROBE | PROTOCOL | PACKETS | BYTES |
|---|---|---|---|---|
| A-B | $P_1$ | 1 | 4 | 200 |
| A-B | $P_1$ | 2 | 5 | 250 |
| A-B | $P_2$ | 1 | 2 | 75 |
| A-B | $P_2$ | 2 | 1 | 76 |
| A-B | $P_2$ | 3 | 2 | 100 |
| A-E | $P_1$ | 1 | 10 | 500 |
| A-E | $P_2$ | 2 | 4 | 200 |
| A-E | $P_2$ | 3 | 4 | 200 |
| A-E | $P_3$ | 2 | 10 | 500 |
| B-C | $P_2$ | 2 | 3 | 150 |
| B-C | $P_2$ | 3 | 2 | 100 |

81 — BLOCK FOR TEMPORAL INTERVAL 1224

| ADDRESS PAIR | PROBE | PROTOCOL | PACKETS | BYTES |
|---|---|---|---|---|
| A-E | $P_1$ | 2 | 10 | 600 |
| A-E | $P_2$ | 3 | 4 | 200 |
| A-C | $P_1$ | 1 | 15 | 900 |
| A-C | $P_2$ | 1 | 14 | 850 |

FIG. 6

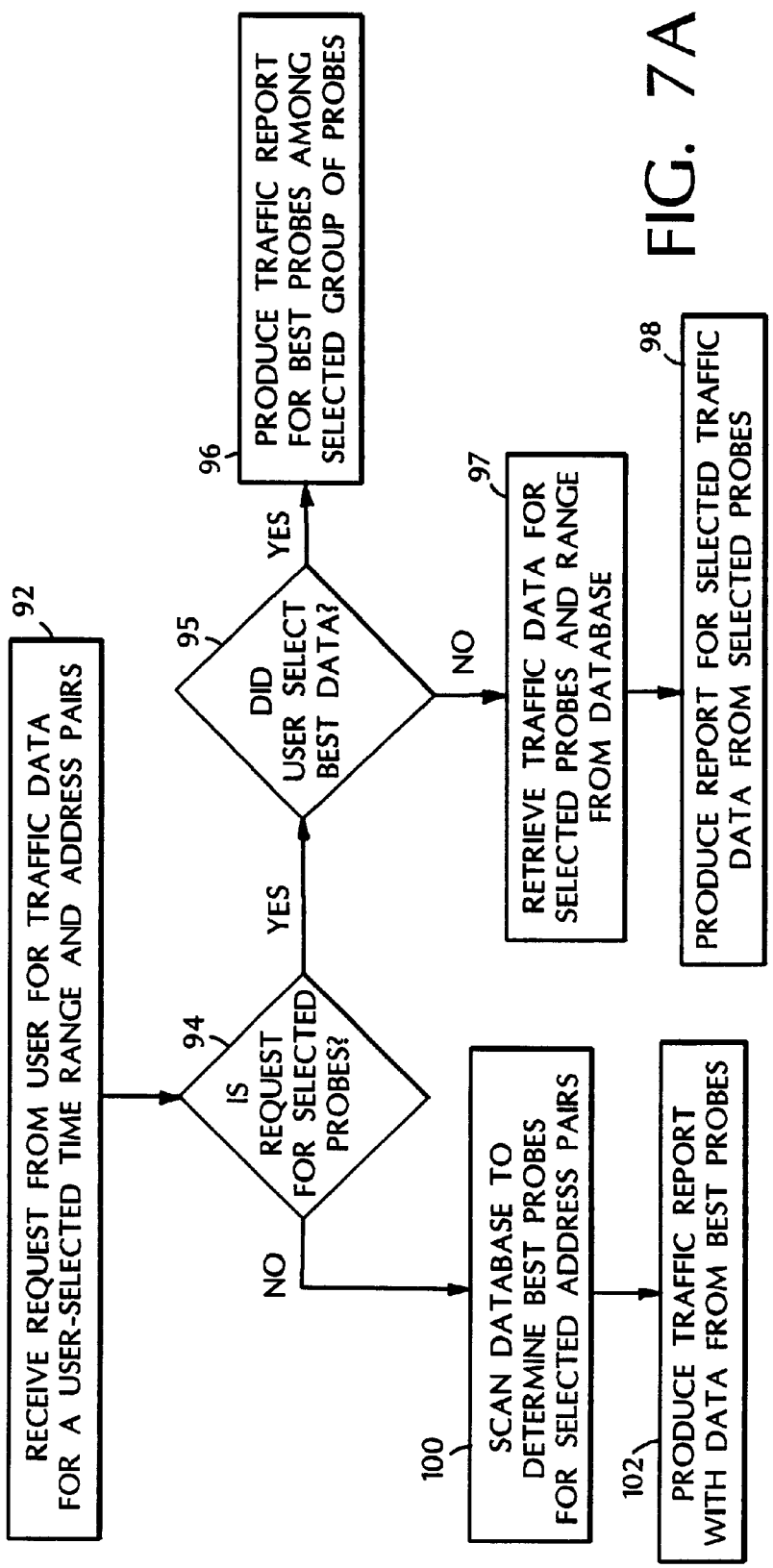

COLLECTING AND REPORTING MONITORING DATA FROM REMOTE NETWORK PROBES

BACKGROUND OF THE INVENTION

This application relates generally to networks, and more particularly, to collecting and reporting network monitoring data accumulated by remote probes.

The present application incorporates by reference, in its entirety, U.S. Pat. No. 5,886,643.

The aforementioned Patent discloses a system for collecting network traffic data, which employs remote probes and a centralized network manager. Each remote probe monitors traffic locally over one or several network segments to which the probe couples. Each remote probe regularly transmits its monitoring data to the centralized network manager. The network manager processes the monitoring data. For example, the manager may tag a portion of the data as representative of the network traffic. The tagged data eliminates redundancies that occur when several probes observe the same traffic. The network manager stores the processed data for later use.

The network manager produces traffic reports using the processed data. The traffic reports provide information on the traffic to and from particular network addresses. The processed data also provides a functional map of the network based on the locations of remote probes. The report and mapping information is approximate, because the processed monitoring data is only representative of the actual network traffic.

SUMMARY OF THE INVENTION

In a first aspect, the invention is a method for collecting and reporting monitoring data for network traffic. The monitoring data is accumulated by a plurality of remote probes. The method includes making a series polls for lists of monitoring data to each probe and receiving the requested lists. Each list has traffic count values that are identified by at least a sampling time, a source address, a destination address and a probe identifier. The method also includes calculating the traffic observed by each probe between successive sampling times and apportioning the calculated traffic data among a single set of consecutive temporal intervals.

In various embodiments, the method steps of apportioning attribute the calculated traffic data to the temporal intervals in a pro rate manner. The portion of traffic data attributed to a particular temporal interval is proportional to the overlap between the associated sampling interval and the particular temporal interval.

In various embodiments, the method also includes storing the apportioned traffic data in a database. The stored data is grouped by the temporal interval, address pair, and probe identity. The traffic data may be further grouped by traffic protocols.

In some embodiments, the method includes finding best probes for selected address pairs in response to requests for traffic reports. The steps of finding the best probes include scanning the stored data to determine which probes observed the most traffic for the selected address pairs for a given temporal interval.

In a second aspect, the invention is a method of recording and reporting network traffic data. The method includes collecting monitoring data from a plurality of remote probes, processing the collected data to produce traffic data for a single set of consecutive temporal intervals, and storing the traffic data for each temporal interval to a database. The entries of the database are grouped together by temporal interval, monitoring probe identifier, and address pair. The monitoring data from first and second portions of the probes correspond to nonaligned sampling times.

In some embodiments, the steps of processing calculate traffic data for sampling intervals and apportion the calculated traffic data among the temporal intervals. The amount of traffic apportioned to a particular temporal interval is proportional to the overlap between the associated sampling interval and the particular temporal interval.

In response to a request for a traffic report, some embodiments also scan the traffic data to find the probes that observed the most traffic for selected address pairs. These embodiments may also make the requested report with the traffic data from the probes that observed the most data for a given temporal interval.

In a third aspect, the invention is a method for collecting and reporting network traffic. The method includes receiving monitoring data from a plurality of remote probes, calculating traffic data for sampling intervals from the monitoring data, and processing the calculated traffic data to apportion the data among a single set of temporal intervals. The sampling times of at least one probe do not coincide with the sampling times of the other probes. The data apportionment is pro rata according to the overlap between the associated sampling intervals and the temporal intervals.

In a fourth aspect, the invention is memory storage media encoded with executable programs of instructions. Each program performs one of the above-described methods.

The various embodiments can collect monitoring data from network probes that accumulate data during noncoinciding and/or non-aligned sampling intervals. This allows the collection of monitoring data from network structures that internally determine the sampling intervals for acquiring the monitoring data.

Some embodiments identify best probes to tag address pairs at the time that a network traffic report is prepared. The best probe for an address pair is the probe that observed the most traffic for the pair. The best probe is selected from network structures that monitor network traffic. The network structures for probes may include individual network devices and portions of other network devices. The best probe may accumulate monitoring data on network traffic in sampling intervals that do not coincide with the sampling intervals of other probes.

BRIEF DESCRIPTION OF THE DRAWINGS

Other objects, features, and advantages of the invention will be apparent from the following description taken together with the drawings, in which:

FIG. 6 illustrates a portion of the traffic data recorded in the database of FIG. 4; and FIG. 7A illustrates a method for producing traffic reports using the traffic data stored by the methods of FIGS. 5A–5C;

DESCRIPTION OF THE PREFERRED EMBODIMENTS

Figure 1:
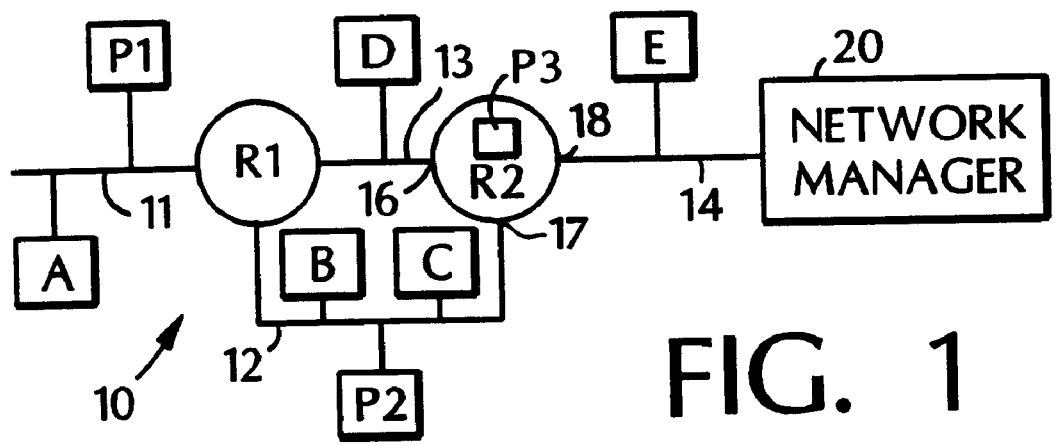
FIG. 1 illustrates a representative multi-segment network and an associated network manager.

FIG. 1 shows an exemplary network 10 having segments 11–14 and network devices A–E. The network devices A–E may be workstations, servers, or other identifiable network structures. The topology of the network 10 and the number of segments 11–14 and network devices A–E vary in the different embodiments.

Each network device A–E has a network address and communicates with other network devices A-E through one or more protocols. The devices A–E of the individual segments 11–14 communicate through the segments 11–14 themselves. The devices A–E of the different segments 11–14 communicate through the routers R1–R2 and/or other known inter-segment connection devices (not shown).

Various types of remote hardware structures monitor traffic on the network. These monitoring structures may be stand alone devices or integral parts of parent devices, i.e., routers, gateways, etc. Henceforth, all remote structures that monitor network traffic and transmit accumulated monitoring data in response to polling are referred to as remote probes.

Remote probes P1–P3 monitor network communications between pairs of network addresses. The remote probes P1–P3 transmit their monitoring data to a network manager 20 in response to being polled by the manager 20. To collect data, each probe P1–P3 monitors communications passing over a local medium to which the probe is directly coupled. The stand alone probes P1 and P2 monitor traffic over the segments 11 and 12, respectively. The probe P3 monitors traffic through the ports 16–18 of the router R2 of which the probe P3 is an integral part.

Remote probes continually collect data in counters and increase the counter value of the counters in response to the observing a new network communication. Each set of counter values can be indexed by a sampling time, the sampling time being associated with the values of the probe's counters at a particular time. A sampling interval is the interval between consecutive sampling times for the same probe. The difference between the counter values for two sampling times determines the traffic observed during the sampling interval bounded by the two sampling times.

Remote probes collect and transmit monitoring data in accordance with one of a number of standards. A probe operating according to the Remote Monitoring II (RMON II) standard of the Internet Engineering Task Force (IETF) transmits monitoring data, e.g., counter values, present at the time that it is polled. Thus, a RMON II probe's sampling time equals the time of receipt of the polling request. RMON II probes do not time stamp data transmitted data. Thus, the various embodiments take the receipt time for the data, by the network manager 20, as the approximate sampling time. Typically, the receipt time is close to the time that the polling request arrives at the probe, i.e., the true sampling time. Other probes operate according to a different standard. One example of another approach is a CISCO probe which is integral to a CISCO router. A CISCO probe transmits monitoring data having a sampling time internally fixed by the CISCO router. Thus, a CISCO probe does not generally transmit monitoring data for which the sampling time equals the polling time. The CISCO probe also transmits subtracted monitoring data, i.e., the transmitted counts reflect new traffic for the sample interval directly, but this aspect is not essential to the embodiments.

Still other probes may operate according to other standards. The various types of probes are classified according to whether they transmit monitoring data for which the sampling time approximately equals the polling time or not. If the sampling time is an internally defined time, then that is independent of when the probe is polled.

In the illustrative example below, the probes P1 and P2 are RMON II probes, and the probe P3 employs an approach similar to that of a CISCO probe.

Figure 2:
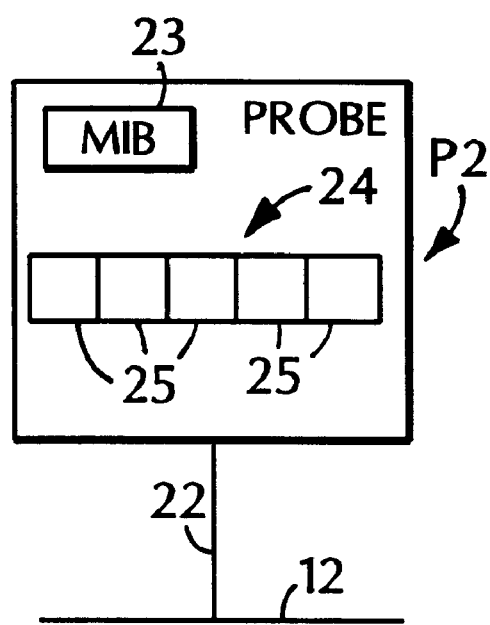
FIG. 2 illustrates a RMON II probe, which monitors one segment of the network in FIG. 1.

FIG. 2 illustrates the probe P2. The probe P2, which is connected by a line 22 to the segment 12, monitors network communications traveling over the segment 12. The probe P2 has a set of non-decreasing counters 24 for accumulating monitoring data. The probe P2 increments the stored counter values in response to observing traffic. The counter values are packet counts and/or byte counts for the observed traffic. The counters of the probe P2 are indexed identifiers stored in a management information base (MIB) 23, i.e., a standard of the Internet Engineering Task Force. Individual counters 25 are indexed by a source and destination address pair and a protocol of the network communications for which the counters store traffic data, e.g., for RMON II probes the protocol follows the IETF standard. In response to being polled, the probe P2 will transmit the counter values present at the time of polling.

Figure 3:
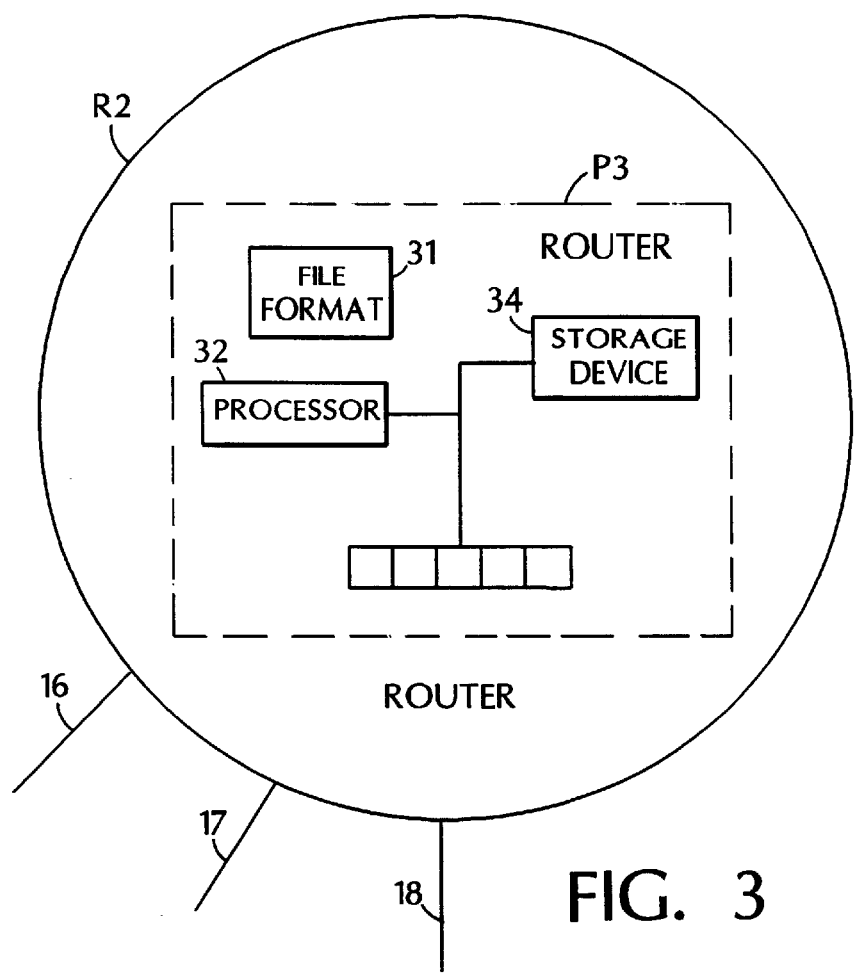
FIG. 3 illustrates a router of the network in FIG. 1.

FIG. 3 illustrates the router R2 and the probe P3, which is an integral part of the router R2. The probe P3 accumulates traffic data for communications sent through router ports 16–18 in a series of counters 30. The counters 30 are again indexed by values stored in a file format 31, e.g., a proprietary file format. An internal processor 32 automatically writes the difference between prior counter values and current values in the counters 30 to a file in an internal storage device 34 at regular times, i.e. the sampling times. The entries of the files for the counter values are indexed by source and destination addresses, protocol, and the transmitting router port 16–18. At any particular time, the storage device 34 may store monitoring data for several consecutive sampling times.

The probe P3 responds to, at least, two types of polling requests. In response to the first type of polling request, the probe P3 transmits a list of the sampling times and filenames stored in the internal storage device 34. In response to the second type of polling request, the probe P3 transmits requested files from the storage device 34.

The network manager 20 polls the probe P3 for monitoring data in the storage device 34 and not for the counter values in the counters 30 themselves. Thus, the monitoring data received by the network manager 20 has a sampling time that is determined internally by the router R2. Since the router R2 determines the sampling times, the monitoring data from the probe P3 has a sampling time that does not generally coincide with the sampling times of the monitoring data from the other probes P1 and P2.

Figure 4:
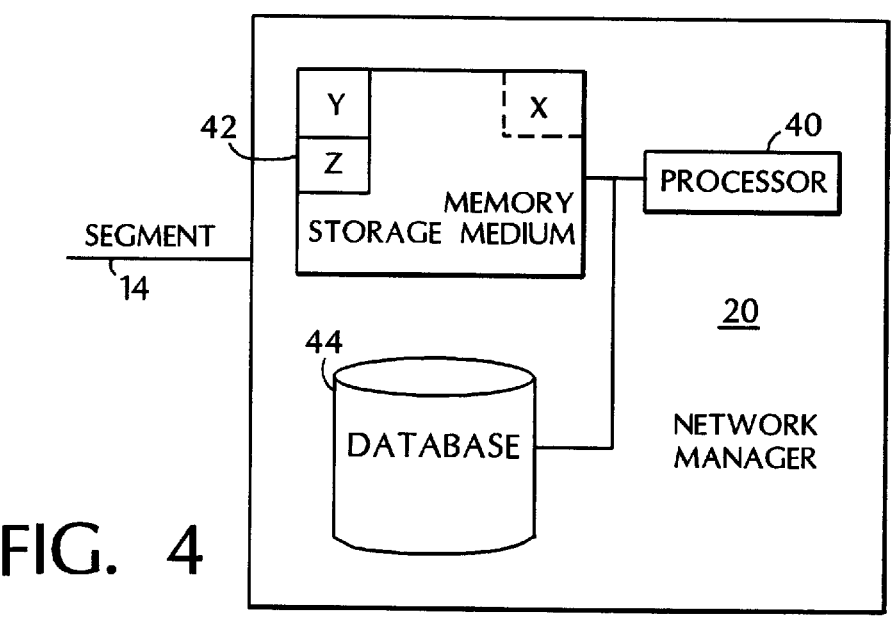
FIG. 4 illustrates the network manager of FIG. 1.

FIG. 4 illustrates the network manager 20 of FIG. 1. The network manager 20 has a processor 40 and a memory storage medium 42, i.e., an active memory, ROM, or a hard disk. The memory storage medium 42 stores three programs X, Y, and Z, which are executable by the processor 40. The program X controls polling and processing of polled monitoring data from the probes P1 and P2. The program Y controls polling and the processing of polled monitoring data from the probe P3. The program Z controls the preparation of traffic reports from traffic data stored in a database 44. When executed by the processor 40, the programs X and Y control the collection of monitoring data, and the program Z controls the preparation of traffic reports.

Figure 5A:
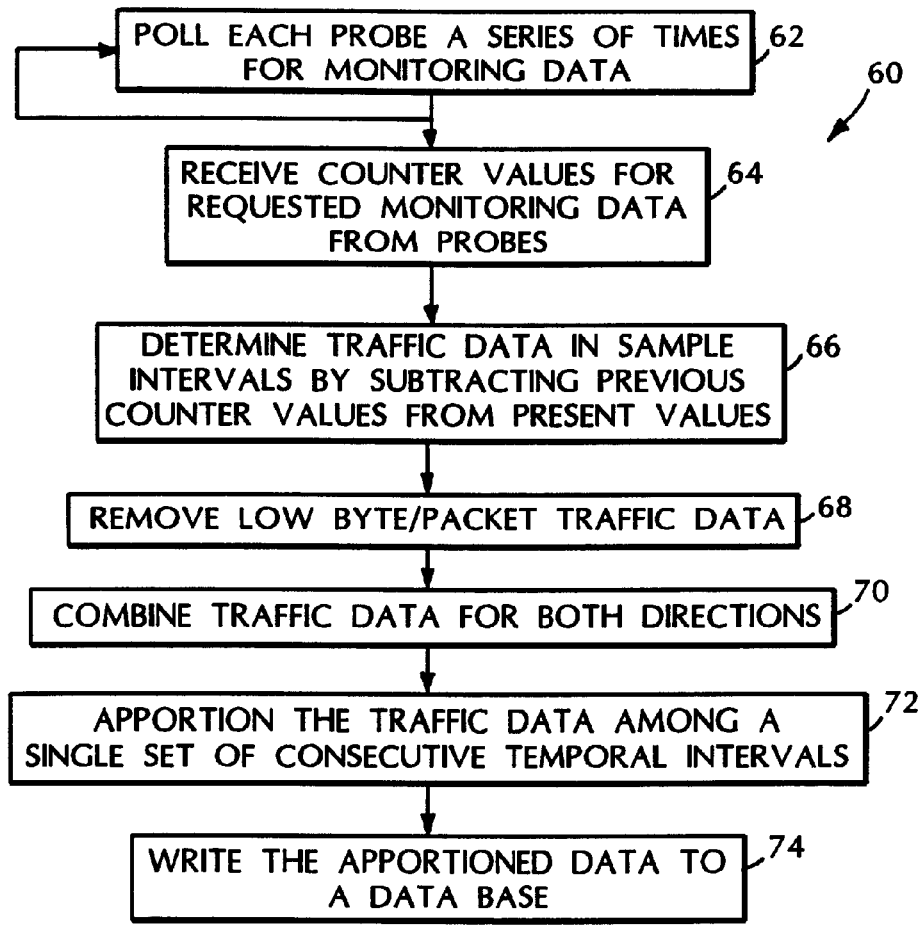
FIG. 5A is a flow chart illustrating a method of collecting and recording monitoring data from the probes of FIG. 1.

FIG. 5A illustrates a method 60 of collecting monitoring data from the probes P1–P3 of FIG. 1. The network manager 20 periodically polls each of the remote probes P1–P3 for monitoring data (step 62). In response to each poll, the network manager 20 receives from each probe P1–P3 a series of data messages with the requested monitoring data (step 64). Each message contains monitoring data for one sampling time and is a response to one of the polls.

The data messages include counts (i.e. entries for counter values) and identifying data associated with the counts. The counter values indicate amounts of traffic observed, i.e., either byte quantities or packet counts. The identifying data specifies a sampling time, a probe identifier, source and destination addresses, a data protocol, and other data.

The manager 20 determines the observed amount of traffic for each sampling interval by subtracting counter values for the immediately preceding sampling time from the counter values for the present sampling time (step 64). Each subtraction is performed separately for the counter values indexed by a probe identifier, a source address, a destination address, and a protocol. From the subtractions, the network manager 20 generates traffic data indexed by sampling intervals, a probe identifiers, a source and destination address pair, protocols, and a router port number if applicable. Since the different probes P1–P3 return data with different sampling times, the traffic data from the different probes P1–P3 may not correspond to coinciding sampling intervals.

Next, the network manager 20 processes the traffic data to reduce data volumes. First, the network manager 20 disregards traffic data corresponding to below threshold quantities of bytes and/or packets (step 68). The threshold is a byte rate expressed in bytes per minute. Below-threshold data is of limited usefulness and would occupy substantial storage space in the database 44.

In some embodiments, the network manager 20 also reduces data volumes by combining traffic data for both communication directions (step 70). The manager 20 performs the combine step for data between the same pair of addresses. The combined traffic data only depends on the address pair instead of the source and destination designations of the individual addresses. Combining traffic data for both communications directions cuts storage requirements in half.

Next, the manager 20 apportions traffic data of all probes among a single set of consecutive temporal intervals (step 72). The apportionment converts the traffic data indexed by sampling intervals into traffic data indexed by the single set of consecutive temporal intervals. The apportionment is illustrated by examples in FIGS. 5B and 5C.

Figure 5D:
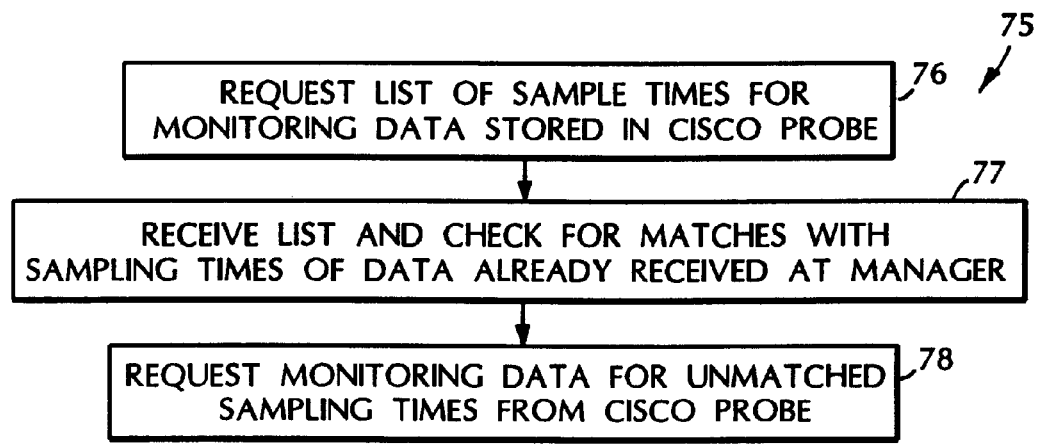
FIG. 5D is a flow chart illustrating a method for requesting monitoring data from a probe integral to a router.
Figure 5B:
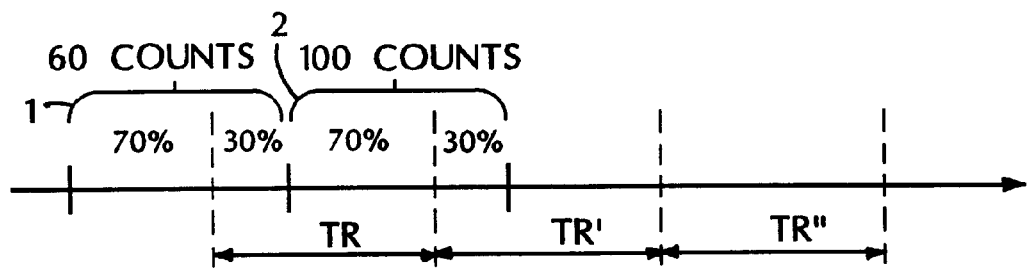
FIG. 5B is a time line illustrating how monitoring data for sampling intervals is apportioned to a single set of temporal intervals.

FIG. 5B illustrates the apportionment step by an example in which a specific probe reported 60 counts of data packet traffic during a sampling interval 1 and 100 counts of data packet traffic during the next sampling interval 2. The apportionment step assigns a percentage of the original traffic data for each sampling interval 1, 2 to each of the fixed set of temporal intervals TR, TR', TR". The fixed set of temporal intervals TR, TR', TR" are consecutive and of equal length. The manager 20 internally defines the temporal intervals TR, TR', TR". The apportionment percentages are determined by overlaps between the sampling intervals 1, 2 and the internally fixed temporal intervals TR, TR', TR". For example, the temporal interval TR overlaps both sampling intervals 1, 2. The apportionment step assigns a pro rata percentage of the data from each of the sampling intervals to the temporal intervals TR, TR'.

Each apportionment percentage is equal to the percentage of the corresponding sampling interval 1, 2 that falls within the fixed temporal interval TR, TR'. In the above example, thirty percent of the sampling interval 1 and seventy percent of the sampling interval 2 fall within the temporal interval TR. Thus, the apportionment of step 74 assigns thirty percent of the counts from the sampling interval 1, i.e. eighteen counts, and seventy percent of the counts from the later sampling interval 2, i.e., seventy counts, to the temporal interval TR. After apportionment, the temporal interval TR is assigned a total of eighty-eight counts.

Referring again to FIG. 5A, the network manager 20 writes the apportioned traffic data to the database 44 of FIG. 4 after apportioning the data to the fixed set of temporal intervals (step 74). The database 44 indexes the traffic data by the fixed set of temporal intervals, i.e., the intervals TR, TR' of FIG. 5B.

When a network's probes includes CISCO probes, e.g., the probe P3 of FIG. 1, the traffic data from CISCO probes has special sampling times. Due to these special sampling times, the data from the CISCO probes and the RMON II probes is not directly comparable. The apportionment at step 74 of FIG. 5A eliminates the different sampling intervals so that the resulting traffic data from the CISCO and RMON II probes can be compared.

Figure 5C:
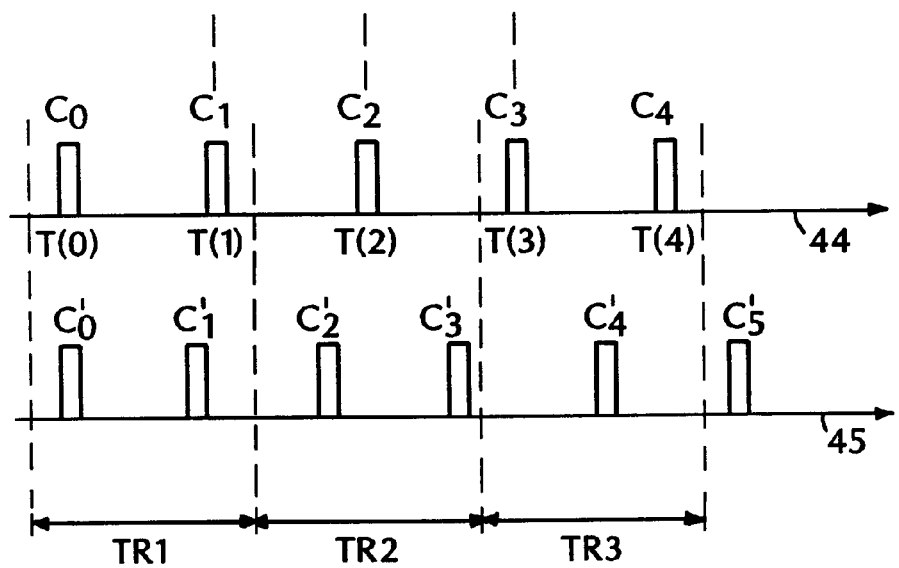
FIG. 5C is a timing diagram showing the sampling times of the monitoring data accumulated by two remote probes in FIGS. 1–3.

FIG. 5C shows exemplary timing lines 44, 45 that illustrate the timing differences between monitoring data from the RMON II probe and the CISCO probe. The probe transmits counter values C(i) having sampling times T(i). The probe counter values C' (j) have sampling times T' (j). The sampling times T(i) and T' (j) do not coincide, i.e., the sampling intervals do not coincide.

During apportionment, the network manager 20 assigns monitoring data from the RMON II and CISCO probes to the single set of consecutive temporal intervals TR(k). The manager 20 assigns the counter data C(2)–C(1) for the sampling interval between T(1) and T(2) to the temporal intervals TR(1) and TR(2) pro rata. Similarly, the manager 20 assigns the counter data C' (2)–C('1) for the sampling interval between T' (1) and T' (2) to the same temporal intervals TR(1) and TR(2) pro rata. After apportioning, the traffic data from both the RMON II and CISCO probes correspond to the same set of temporal intervals TR(1), TR(2), etc.

Referring to FIGS. 4, 5A and 5C, processor initialize the programs X and Y so that each program X and Y uses TR(k)'s with the same boundary values and lengths. Thus, each program X and Y uses the same set of consecutive temporal intervals TR(k) during the apportionment step 74. After apportionment, the data from all probes P1–P3 is indexed by the same set of consecutive temporal intervals TR(k).

FIG. 5D is a flow chart illustrating a method 75 of requesting monitoring data from the probe P3 of FIGS. 1 and 3. First, the network manager 20 requests a list of sampling times for which the router's storage device 34 has stored monitoring data (step 76). Next, the network manager 20 compares the list of sampling times from the probe P3 with the sampling times of monitoring data already received by the network manager 20 to find matches (step 77). Finally, the manager 20 requests traffic data for the sampling times on the list not matching the sampling times of already received data (step 78). By eliminating the matching sampling times, the network manager 20 reduces network traffic, which would otherwise be associated with repeat transfers of monitoring data from the CISCO probe P3.

Also, the method 75 avoids collecting unuseful data. Thus, the probe avoids writing counter values to the internal storage device several times between pollings by the manager 20. The manager only requests the monitoring data for one sampling time between successive pollings, i.e. the last sampling time.

FIG. 6 illustrates how the traffic data is stored in the database 44 of FIG. 4. The database 44 stores the traffic data for each temporal interval in a separate block 80, 81. Two such blocks 80 and 81 for consecutive temporal intervals are shown in FIG. 6. Each block contains sub-blocks 82–84 that store the traffic data for one pair of addresses. Consecutive rows 86–87 of a sub-block 82 list the traffic data from a single probe P1, P2 as a function of the original communication's protocol. Each row lists both a packet count 88 and a data byte count 89, an address pair, a probe identifier, and a protocol. The organization of the database 44 reduces the time needed to search for traffic data when compiling traffic reports and provides a quick means for comparing probe data in a sub-block.

Referring again to FIG. 1, the remote probes P1–P3 collect monitoring data on communications between pairs of network devices A-E. The communications between a fixed pair of devices A and C may take different routes. For example, some communications between devices A and C may travel over the segments 11, 13, 12 and the routers R1 and R2. Other communications between devices A and C may travel over the segments 11, 12 and the router R1. Thus, the monitoring data from individual probes, e.g., P2 and P3, often only gives a "partial" picture of the actual traffic between the monitored address pairs A and C. On the other hand, the monitoring data from the entire set of probes P1–P3 often gives overcounts, because several probes P1–P3 observe the same communication. For example, both probes P1 and P2 observe communications traveling from the router R1 to device C along the segment 12.

The various embodiments obtain "good" traffic data on communications between individual address pairs by identifying a "best" probe. The best probes give a better picture of the traffic between an associated pair of network addresses than other probes. For each pair of addresses, a best probe is dynamically selected from the whole set of probes that locally monitor network traffic, i.e., the probes P1–P3.

The "best" probe for a pair of network addresses is defined as the probe that observes the most traffic between the associated address pair. The traffic observed by the best probes provides a best available measure of the actual 10 traffic between the associated pair of network addresses. By using monitoring data from a single probe, i.e., the best probe, as a representative measure of the traffic between an address pair, traffic is not double counted.

FIG. 7A illustrates a method 90 for producing traffic reports from the traffic data compiled with the method of FIGS. 5A–5D. The network manager 20 receives a user request for traffic data between selected address pairs and in a selected time range (step 92). Next, the processor 40 determines whether the user has requested traffic data from a user-selected set of probes P1–P3 (step 94). If the user has selected the probe(s), the processor 40 determines whether the user has requested data from best probes (step 95). If data from best probes was requested, the processor 40 finds the best probes from among the selected probes and returns monitoring data observed these best probes (step 96). If data from best probes was not selected, the processor 40 retrieves the requested traffic data for all selected probes from the database 44 and writes the data to the memory 42 (step 97). Then, the network manager 20 produces a traffic report for the selected address pairs and time range from the retrieved traffic data (step 98).

If the user has not selected the probes for the traffic report, the request is presumed to be for "best" probe data. In this case, the network manager 20 scans the user selected time range of the database 44 to find a "best" probe for each user selected address pair (step 100). Then, the manager 20 produces a report for the selected time range, which indicates the traffic observed by the best probes between the selected address pairs (step 102).

Figure 7B:
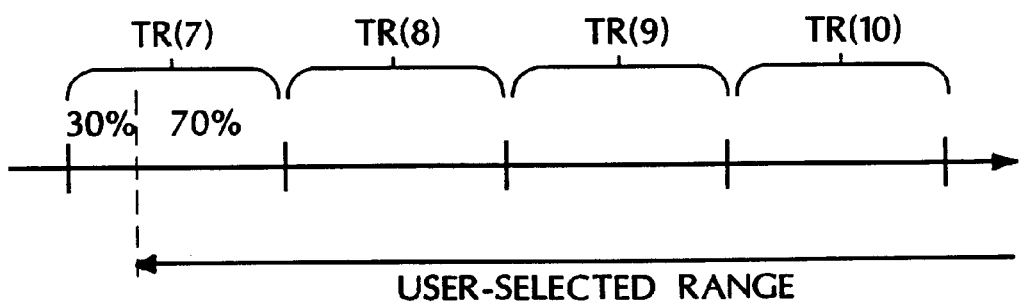
FIG. 7B is a time line illustrating how traffic data from the single set of temporal intervals is apportioned in traffic reports.

FIG. 7B illustrates that the network manager 20 pro rates traffic quantities if the user-selected time range does not coincide with the consecutive temporal intervals TR(k). The shown user-selected time range overlaps seventy percent of the temporal interval TR(7). Thus, the program Z reports seventy percent of the traffic data in the interval TR(7) as observed traffic data in the user-selected time range. The program Z reports that the amount of traffic in the user-selected range is seventy percent of the traffic in TR(7) plus the traffic in TR(8), TR(9), etc.

Generally, the program Z reports a percentage of the traffic of a temporal interval TR(K) as traffic observed in the user-selected range. The reported percentage is equal to the percentage of the temporal interval that overlaps the user-selected time range.

Figure 8:
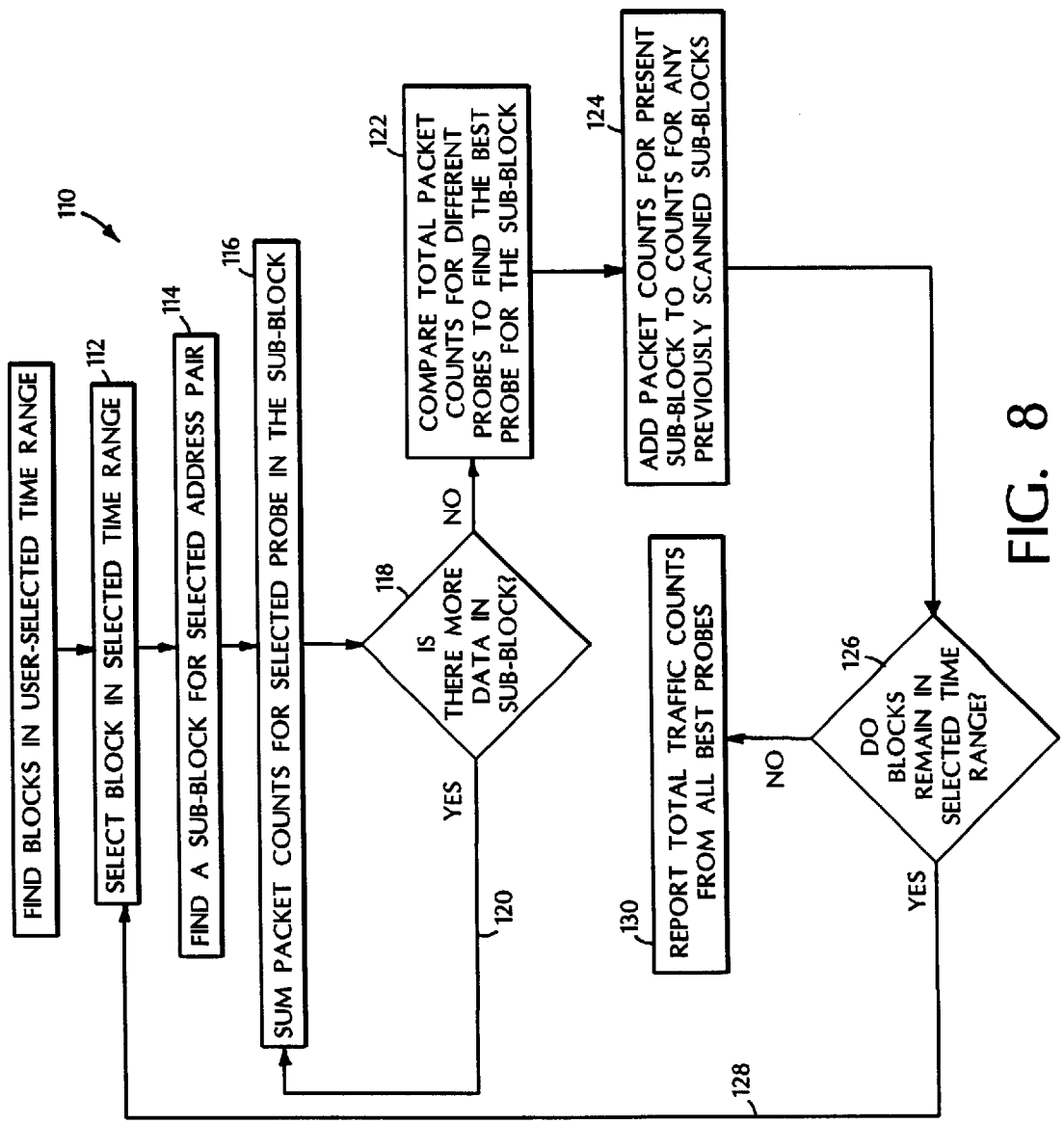
FIG. 8 illustrates a method for finding the best probe in the data structure illustrated in FIG. 6.

FIG. 8 illustrates a method 108 for finding traffic data from best probes using the data structure illustrated in FIG. 6. First, network manager 20 determines which blocks correspond to the user selected time range (step 110). Next, the network manger 20 selects a block in the range (step 112). For example, the selected block may be block 80 of FIG. 6. Next, the network manager 20 finds the sub-block in the selected block with traffic data for the selected address pair (step 114). For example, if the selected address pair is A and B, sub-block 82 of block 80 is selected. Next, the network manager 20 sums the packet counts for all protocols indexed by the first probe in the selected sub-block (step 116). The manager would find that probe P1 has observed 9 packets. Next, the network manager 20 determines whether additional traffic data exists in the sub-block (step 118). If additional traffic data exists, the network manager 20 repeats step 116 for the traffic data corresponding to the next probe 120. In the case of block 80 of FIG. 6, the manager would find that probe P2 has observed 5 packets. If additional traffic data does not exist, the network manager 20 compares the packet counts for different probes in the sub-block to find the best probe (step 122). The best probe has the highest packet count for the sub-block 82. The network manager 20 would find that probe P1 has the highest packet count and is the best probe for the sub-block 82. Next, the network manager 20 add the traffic count for the best probe of this sub-block to the traffic counts for best probes from previously scanned blocks (step 124). Then, network manager 20 determines whether additional blocks remain in the selected time range (step 126). If additional blocks remain, the network manager 20 loops back to step 112 to select the next block in the time range 128. If additional blocks do not remain, the network manager 20 reports the sum of the traffic counts for the best probes of all sub-blocks in the selected range as the best probe data (step 130).

For the organization of the database 44 shown in FIG. 6, the network manager 20 needs less time to scan the database 44 to find best probes.

Other aspects, advantages, and modifications are within the scope of the following claims.

What is claimed is:

1. A method for collecting and reporting monitoring data for network traffic accumulated by a plurality of remote probes, comprising:

making a series of polls to each prove of the plurality for lists of monitoring data;

receiving the lists of monitoring data from each probe, each lists having traffic count values, each traffic count value being identified by a sampling time, a source address, a destination address and a probe;

calculating the traffic observed by each probe between successive sampling times; and apportioning the calculated traffic data for each probe among a single set of consecutive temporal intervals.

2. The method of claim 1, wherein a first portion of the sampling times are determined by the timing of the polls and a second portion of the sampling time are flexed by external structures.

3. The method of claim 1, wherein the steps of calculating the traffic include subtracting probe counter values at successive sampling times, the traffic count values being the values from probe counters.

4. The method of claim 1, wherein the steps of apportioning attribute the calculated traffic data to the temporal intervals in a pro rata manner, the portion of traffic data attributed to a particular temporal interval being proportional to the overlap between the associated sampling interval and the particular temporal interval.

5. The method of claim 1, further comprising:

storing the apportioned traffic data to a database, the stored data being grouped by the temporal interval, address pair, and probe identity.

6. The method of claim 5, further comprising:

finding best probes for selected address pairs from the stored traffic data in response to a request for a traffic report for the selected address pairs.

7. The method of claim 6, further comprising:

reporting the stored traffic data for the best probes in response to the request for a traffic report.

8. The method of claim 6, wherein each step of finding comprises:

scanning the stored data to determine which probe observed the most traffic for the associated address pair in a preselected range of temporal intervals.

9. The method of claim 8, wherein the step of scanning determines which probe observed the most traffic by comparing summed data packet counts for probes.

10. The method of claim 5, wherein the traffic data is further grouped by traffic protocols.

11. The method of claim 1, wherein the traffic count values include one of counter values for data packet counts and counter values for data byte counts.

12. A method of recording and reporting network traffic data, comprising:

collecting monitoring data from a plurality of remote probes, the monitoring data from first and second portions of the probes corresponding to non-aligned sampling times;

processing the collected data to produce traffic data for a single set of consecutive temporal intervals; and storing the traffic data to a database, entries of the database being grouped together by the temporal intervals, the monitoring probe identifiers and address pairs.

13. The method of claim 12, wherein the steps of processing comprise:

calculating traffic data for sampling intervals by subtracting probe counter values at successive sampling times; and apportioning the traffic data for sampling intervals among the temporal intervals, the amount of traffic attributed to a particular temporal interval being proportional to the overlap between the associated sampling interval and the particular temporal interval.

14. The method of claim 12, further comprising:

scanning the stored traffic data to determine which probes observed the most traffic for each of a selected set of address pairs in response to a request for a traffic report for the selected set of address pairs.

15. The method of claim 14, further comprising:

reporting the stored traffic data for the probes that observed the most data in response to the request for a traffic report.

16. The method of claim 14, wherein the step of scanning determines which probe observed the most traffic by comparing summed data packet counts for the various probes.

17. The method of claim 14, wherein the steps of scanning make a limited scan of the database for the traffic data from a portion of the probes, the portion of the probes being fixed by the request for a traffic report.

18. A method for collecting and reporting network traffic, comprising:

receiving monitoring data from a plurality of remote probes, the sampling times for the monitoring data of at least one of the probes not coinciding with the sampling times of the other probes;

calculating traffic for sampling intervals from the monitoring data of each probe; and processing the calculated traffic data to produce traffic data apportioned among a single set of temporal intervals pro rata according to the overlap between the associated sampling intervals and the temporal intervals.

19. The method of claim 18, further comprising:

storing the processed traffic data to a database in hierarchical groups organized by temporal interval and source and destination address pair.

20. The method of claim 19, further comprising:

scanning the database to find the probes that observed the most traffic between selected pairs of addresses in response to a request for a traffic report on the selected pairs of addresses.

21. A storage medium encoding an executable program of instructions for a method of collecting and reporting monitoring data for network traffic data accumulated by a plurality of remote probes, the instructions comprising:

making a series of polls for lists of monitoring data to each probe of the plurality;

receiving the lists of monitoring data from each probe, each list having traffic count values identified by at least a sampling time, a source address, a destination address and a probe;

calculating the traffic observed by each probe between successive sampling times; and apportioning the calculated traffic data among a single set of consecutive temporal intervals.

22. The medium of claim 21, wherein the instructions for calculating the traffic include instructions for subtracting probe counter values at successive sampling times, the traffic count values being the values of probe counters.

23. The medium of claim 21, wherein the instructions for apportioning attribute the calculated traffic data to the temporal intervals in a pro rata manner, the portion of traffic data attributed to a particular temporal interval being proportional to the overlap between the associated sampling interval and the particular temporal interval.

24. The medium of claim 21, the instructions further comprising:

storing the apportioned traffic data to a database, the stored data being grouped by the temporal interval, address pair, and probe identity.

25. The medium of claim 24, the instructions further comprising:

finding best probes for selected address pairs from the stored traffic data in response to a request for a traffic report for the selected address pairs.

26. The medium of claim 25, the instructions further comprising:

reporting the stored traffic data for the best probes in response to the request for a traffic report.

27. The medium of claim 26, wherein the instructions for finding comprises:

scanning the stored data to determine which probe observed the most traffic for the associated address pair in a preselected range of temporal intervals.

28. A storage medium encoding an executable program of instructions for collecting and reporting network traffic data, the instructions comprising:

collecting traffic monitoring data from a plurality of remote probes, the monitoring data from first and second portions of the probes corresponding the non-aligned sampling times;

processing the collected data to produce traffic data for a single set of consecutive temporal intervals; and storing the traffic data to a database with entries being grouped together by the temporal intervals, the monitoring probe identifiers and address pairs.

29. The medium of claim 28, wherein the instructions of processing further comprise:

calculating traffic data for sampling intervals by subtracting probe counter values at successive sampling times; and apportioning the traffic data for sampling intervals among the temporal intervals, the amount of traffic attributed to a particular temporal interval being proportional to the overlap between the associated sampling interval and the particular temporal interval.

30. The medium of claim 28, the instructions further comprising:

scanning the stored traffic data to determine which probes observed the most traffic for each of a selected set of address pairs in response to a request for a traffic report for the selected set of address pairs.

31. The medium of claim 30, the instructions further comprising:

reporting the stored traffic data for the probes that observed the most data in response to the request for a traffic report.

32. The medium of claim 30, wherein the instructions of scanning make a limited scan of the database restricted to the traffic data for a portion of the probes, the portion of the probes being fixed by the request for a traffic report.

* * * * *

UNITED STATES PATENT AND TRADEMARK OFFICE
CERTIFICATE OF CORRECTION

PATENT NO.   : 6,278,694 B1                           Page 1 of 1
DATED        : August 21, 2001
INVENTOR(S)  : Will C. Lauer, Lawrence A. Stabile, Bradley S. Carey and Jay B. Wolf It is certified that error appears in the above-identified patent and that said Letters Patent is hereby corrected as shown below:

Column 9,
Line 16, "prove" should be -- probe --.
Line 20, "lists" should be -- list --.
Line 21, delete "a sampling" and insert therefore -- at least sampling --.
Line 29, "flexed" should be -- fixed --.

Signed and Sealed this

Twenty-first Day of May, 2002

Attest:

JAMES E. ROGAN
Attesting Officer
Director of the United States Patent and Trademark Office